Figure 1:
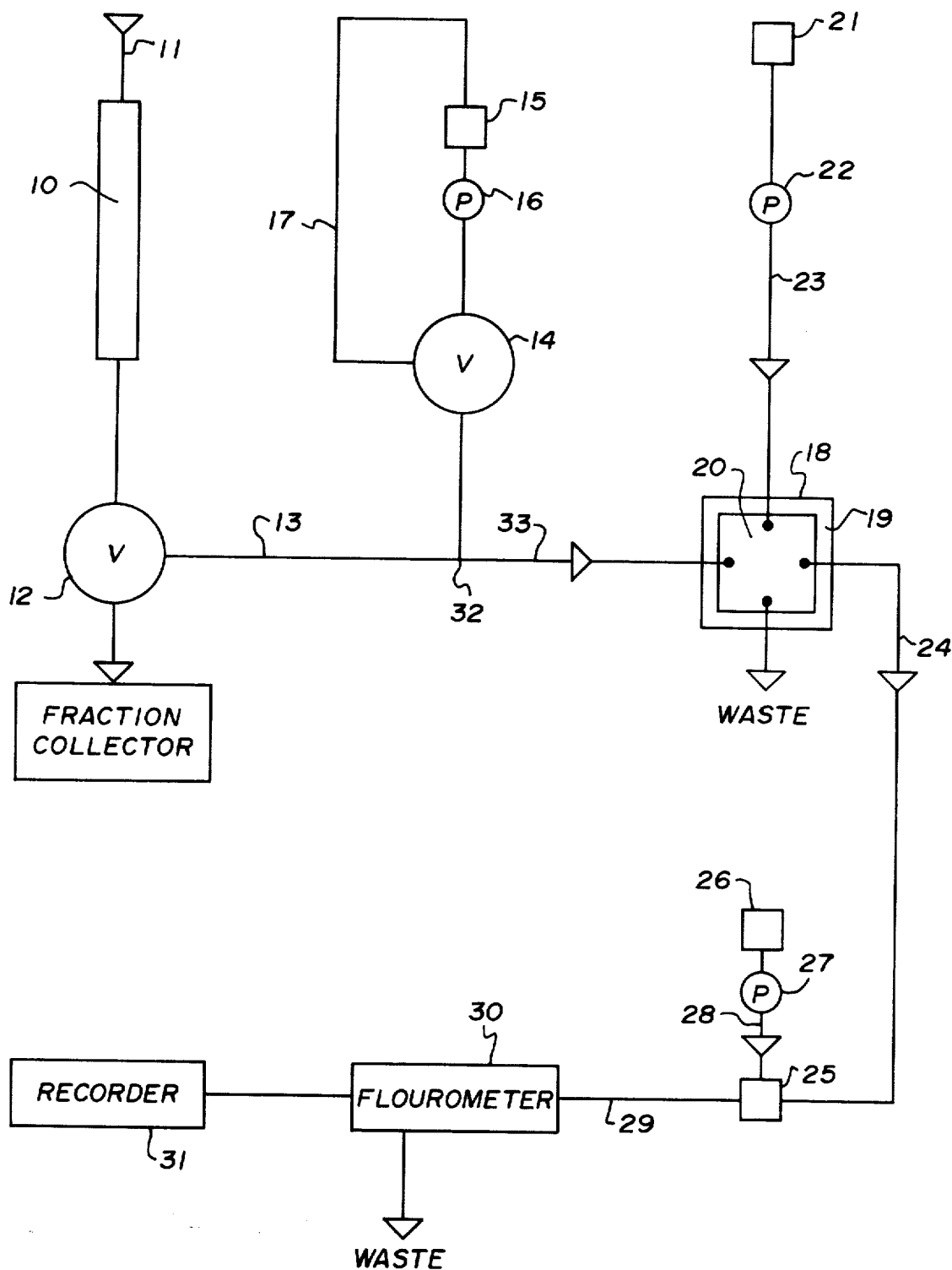

United States Patent [19]
Bohlen

[11] 3,892,532
[45] July 1, 1975

[54] FLUORESCAMINE PEPTIDE ANALYZER

[75] Inventor: Peter Böhlen, Haledon, N.J.

[73] Assignee: Hoffmann-La Roche Inc., Nutley, N.J.

[22] Filed: Oct. 24, 1973

[21] Appl. No.: 409,221

[52] U.S. Cl. .......................... 23/253 R; 137/625.46
[51] Int. Cl. .......................... G01n 33/16; F16k 3/08
[58] Field of Search. 23/253 R; 137/625.11, 625.13, 137/625.15, 625.21, 625.18, 625.46; 222/367–370; 73/422 GC

[56] References Cited
UNITED STATES PATENTS

| | | | |
|---|---|---|---|
| 2,973,117 | 2/1961 | Conklin | 73/422 GC |
| 3,222,135 | 12/1965 | Ashmead | 23/259 X |
| 3,230,048 | 1/1966 | Skeggs | 23/253 R |
| 3,334,969 | 8/1967 | Catravas | 23/253 R X |
| 3,404,780 | 10/1968 | Jungner | 23/253 R X |
| 3,536,450 | 10/1970 | Dus et al. | 23/253 R |
| 3,747,630 | 7/1973 | Hurrell | 137/625.46 |

Primary Examiner—Morris O. Wolk
Assistant Examiner—Timothy W. Hagan
Attorney, Agent, or Firm—Samuel L. Welt; Jon S. Saxe; George M. Gould

[57] ABSTRACT

A peptide analyzer for detection of peptides in column eluates which can be coupled to any peptide separating column comprising a valve system for sampling of the column eluate and a novel stopped-flow hydrolyzer for on line hydrolysis of the stream samples. The hydrolyzer comprises a central cylindrical plate having a plurality of longitudinal channels symmetrically spaced about an internal arc. The central plate is connected to a stepping motor and is held in a liquid tight relationship between an upper and a lower plate, each plate having two channels, one for fluid inlet and one for fluid outlet. The fluid inlet and outlet channels are operatively connected to two of the channels in the central plate. Rotation of the central plate after filling of a channel therein with peptide sample solution containing alkali causes trapping and transfer of a part of said sample solution. Release of the sample solution does not occur until the said central plate channel reaches the outlet station. During the period of entrapment, the sample undergoes alkaline hydrolysis, which hydrolysis is assisted by maintaining the aforesaid apparatus at an elevated temperature.

7 Claims, 2 Drawing Figures

3,892,532

FLUORESCAMINE PEPTIDE ANALYZER

BACKGROUND OF THE INVENTION

Peptide analyzers are in current extensive use for the detection of peptides in column eluates resulting from the chromatographic separation of complex mixtures of peptides. These complex mixtures of peptides may, for example, be derived from the process of sequence analysis of proteins or from extracts of biological tissues.

Detection of the peptides may be accomplished by utilizing colorimetric procedures based on reaction with ninhydrin, preferably after alkaline hydrolysis of the peptides eluted from the column. Commercial apparatus to accomplish this assay on an automated basis are now available.

More recently, a new class of compounds has been developed which react with primary amine groups of compounds such as amino acids, peptides and proteins to yield a highly fluorescent fluorophor. Fluorescence techniques for assaying these primary amine containing compounds has been described in a number of scientific papers including, for example, Bohlen et al., *Arch. Biochem. Biophys.*, 155, 213 (1973), Stein et al., *Arch. Biochem. Biophys.*, 155, 202 (1973) and udenfriend et al., *Science* 178, 871 (1972). A particularly preferred fluorogen of this new class is fluorescamine which is now commercially available.

Even though the new fluorescence based techniques can theoretically improve the sensitivity of the peptide assay by one or more orders of magnitude, due to the fact that some peptides do not react well with the new fluorogens, it is necessary to hydrolyze the peptide containing column eluent prior to assay. However, alkaline hydrolysis of peptides normally requires elevated temperatures for about 15 minutes. This means that the column eluate mixed with the alkaline solution has to flow through a long heated coil in a conventional hydrolyzer in order to provide sufficient hold-up for complete reaction. Passage through such a coil causes a significant loss of resolution between peaks due to intersample diffusion.

DESCRIPTION OF THE INVENTION

The present invention relates to an improved fluorescence peptide analyzer which contains a novel peptide hydrolyzer component. This hydrolyzer component comprises a cylindrical plate having a plurality of longitudinal channels symmetrically placed around an internal arc of the plate. The cylindrical plate is rotatably mounted between two fixed plates which each have two channels for inlet and outlet fluid flow purposes. These inlet and outlet channels are in operative flow relationship to the arc of channels contained in the cylindrical center plate.

Rotation of the cylindrical center plate by a stepping motor causes entrapment and transfer of a portion of the alkaline sample stream flowing through the channel which is indexed in operative relationship to the inlet channel of the outer plate. Release of the entrapped sample portion is not possible until the center plate channel in question is rotated to index with the outlet channel. By placing the outlet channel at the furthest point in the arc in the direction of motion of the center plate, it is possible to maintain the sample entrapped in the channel for a sufficient period of time to ensure hydrolysis of the peptides contained in the sample. The elevated temperature needed for hydrolysis can be readily obtained by immersing or surrounding the hydrolyzer component with a suitable heating means such as, for example, a steam bath, water bath, electric heating coil or mantle or the like.

The resulting hydrolyzed sample is then automatically treated in a flow system with a fluorogenic compound to form fluorophors with the amino acids and peptide fragments which have been produced in the sample by the hydrolysis. These fluorophors are pumped through a flow cell of a conventional fluorometer and the fluorescence produced is measured and recorded. The amount of fluorescence observed is a measure of the peptide content of the eluent stream which had been samples.

Figure 2:
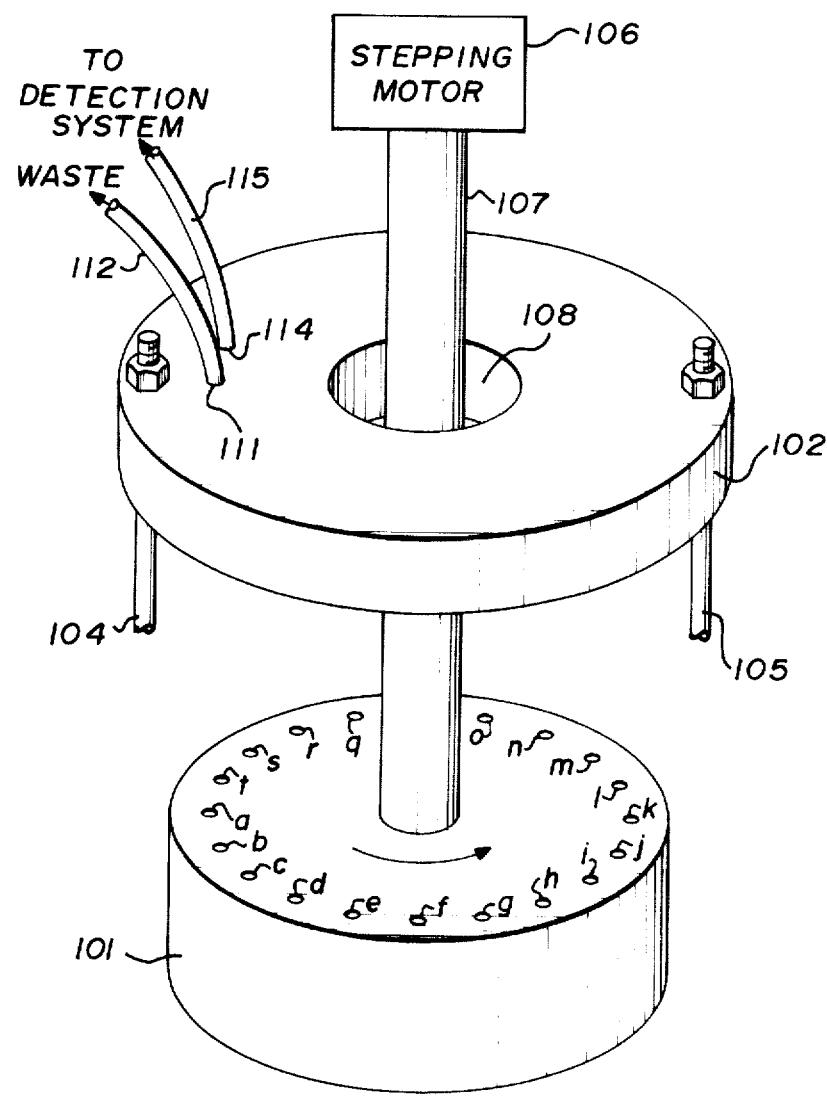
Figure 2:
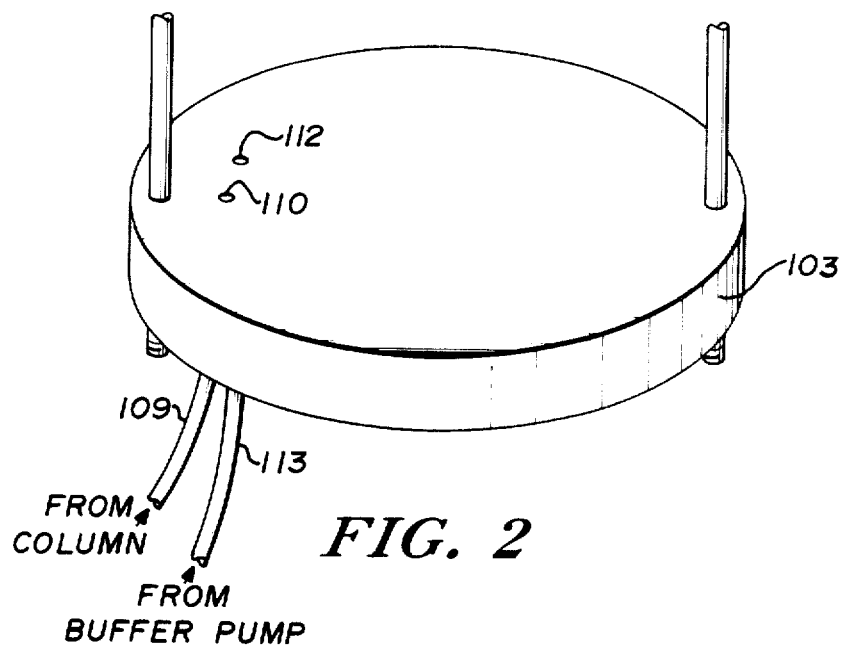

The fluorescence peptide analyzer of the present invention can be more readily understood by reference to the accompanying drawings whierein FIG. 1 is a schematic representation of the entire system whereas FIG. 2 is a side view of the rotating hydrolyzer component.

Turning first to FIG. 1, a peptide containing sample is eluted from chromatographic column means 10 by an elution stream comprising a conventional aqueous buffer, e.g., sodium citrate, sodium acetate, pyridinium acetate and the like, introduced through inlet line 11. The column eluent stream containing varying amounts and types of peptides depending on the time of elution, passes through a two-position valve 12 to a conventional automatic fraction collector (not shown). Valve 12 is in the collecting position at this point in the operating cycle.

At a desired point in the fraction collecting operation, the fraction collector either directly or by means of a signal previously provided to an external electric timer, produces a signal causing valve 12 to index to the sampling position. This position diverts the eluent stream via line 13 to alkaline solution addition tee 32.

The alkaline addition valve 14 is in the recycling position when valve 12 is in the collecting position. In this recycling position alkaline solution such as aqueous sodium hydroxide, potassium hydroxide or other similar bases conventionally used to hydrolyze peptides is taken from reservoir 15 by means of pump 16 and passed through valve 14 to recycle to reservoir 15 by means of line 17.

When valve 12 is indexed to the sampling position, valve 14 is similarly indexed to the addition position. In the addition position of valve 14 the alkaline solution is added to the sample stream and the resulting alkaline sample solution is passed to the hydrolyzer component 18 by means of line 33. The concentration of alkaline added to the sample stream is optional and will be generally in the range conventionally employed in peptide hydrolysis, e.g., 1 to 5 mmol/ml. of sample solution. It is within the skill of the art to adjust the flow rate of the sample stream alkaline solution and/or the alkali concentration of the alkaline solution in order to obtain the desired final concentration of alkali in the sample stream.

The hydrolyzer component 18 comprises an outer enclosure 19 which contains the heating means such as the steam bath, water bath or heating coil and the hydrolyzer valve section 20 which is described in further detail later. The hydrolyzer valve section 20 contains inlets for receiving the alkaline sample stream from line 33 and buffer solution, such as phosphate or borate buffer pH 8–9 from reservoir 21 by means of pump 22 and line 23. The buffer solution is used to wash out the hydrolyzed samples and provides a hydrolyzed sample stream of proper pH for the reaction with the fluorogen which takes place in the next step.

Outlets for sending excess sample to waste and for sending the hydrolyzed and buffered sample stream, now containing amino acids and peptide fragments corresponding to the peptides contained in the original sample, to the detection section via line 24 are also provided within hydrolyzer valve section 20.

The buffered hydrolyzed sample stream in line 24 is passed through a mixing tee 25 or other suitable liquid mixing device known in the art treated with a desired amount of fluorogen solution provided from reservoir 26 by pump 27 through line 28. The preferred fluorogen utilized herein is a member of the new class of 4-(substituted)-spiro[furan-2(3H),1'-phthalan]-3,3-diones which react with primary amine groups of amino acids to produce fluorophors as disclosed in U.S. Patent Application Ser. No. 212,790, filed Dec. 27, 1971, now U.S. Pat. No. 3,812,181, inventors Leimgruber and Weigele. A particularly preferred fluorogen for this purpose is fluorescamine which is now commercially available.

The sample stream now containing fluorophors produced by the reaction of the aforesaid fluorogen with amino acids and peptide fragments contained in the buffered, hydrolyzed sample stream (which amino acids and peptide fragments were derived from the hydrolysis of the peptides in the original sample as above) is then passed to fluorometer means 30 via line 29. Suitable fluorometer means include spectrofluorometers or filter fluorometers equipped with flow cells. Measurement of the fluorescence produced by the excitation of the aforesaid fluorophor results in an electrical signal being produced which signal is directly proportional in amplitude to the intensity of the fluorescence. This electrical signal is transmitted to recorder means 31 where it is graphically displayed as a series of peaks corresponding to the various samples being processed through the analyzer and corresponding in turn to the peptide content of the fractions eluted from the column from which these samples were derived.

The area under each peak is proportional to the quantity of amino acid in the hydrolyzed sample which in turn is proportional to the quantity of peptide in the original sample. If absolute amounts of peptide are to be determined, the analyzer can be standardized by using samples of known peptide content.

In FIG. 2 the aforesaid hydrolyzer valve is shown in detail. This valve consists of a rotating cylindrical plate 101 rotatably mounted and clamped tightly between an upper fixed plate 102 and a lower fixed plate 103. The plates may be constructed out of a conventional materials such as a polyfluorinated ethylene plastic, e.g., Teflon or stainless steel for example. Most preferably, the rotating plate is made of one of the aforesaid type of materials while the stationary plates are made of the other type.

Cylindrical plate 101 contains a plurality of channels bored through its longitudinal axis and disposed symmetrically around the center axis shown as $a \ldots t$ in FIG. 2. It is desirable to have a total of from about 10 to about 60 channels in plate 101. These channels each will have equal volumes in the range of from about 10 to about 100 $\mu$l. Suitable selection of the wide number of combinations of channel diameters and lengths to produce the desired channel volumes is within the skill of the art.

The surfaces between the fixed plates and cylindrical plate 101 are machined to a low friction finish to minimize friction and facilitate rotation of cylindrical plate. In operating condition, plate 101 is clamped tightly between fixed plates 102 and 103 using suitable clamping means such as clamps 104 and 105. In such position the surfaces between the plates provide a liquid tight seal to prevent leakage of liquid between the channels and the plates. To facilitate clamping the diameter of the fixed plates 102 and 103 should be somewhat greater than the diameter of the rotating cylindrical plate 101. Clamping of the plates does not prevent the rotation of cylindrical plate 101.

Rotation of cylindrical plate 101 is accomplished by means of stepping motor 106 which is connected to said plate through shaft 107. This shaft passes through plate 102 by means of a suitable central hole 108. Stepping motor 106 is of conventional design and construction and turns one position upon receipt of an electrical signal. Such signal, for example, could be the same signal as that which indexes valve 12 of FIG. 1 from sampling to collection positions.

In operation, alkaline sample stream flows through inlet tubing 109 and through channel 110 in lower fixed plate 103 into channel a of cylindrical plate 101. After filling channel a, the alkaline sample stream passes out through channel 111 in upper plate 102 and tubing 112 to waste. When plate 101 is rotated as the stepping motor is activated, the quantity of liquid in channel a is entrapped as channel a moves to the position previously occupied by channel b. Entrapment of the alkaline sample stream is continued throughout successive activations of the stepping motor until channel a is indexed to a position which is in direct operative relationship to channel 112 in lower plate 103 and channel 114 in upper plate 102. At this point the now hydrolyzed sample stream is swept out of channel a by means of buffer solution entering in an upwardly flowing direction from inlet tube 113 through channel 112. The hydrolyzed sample stream is carried out to the detection system component of the analyzer through channel 114 and tubing 115. It will thus be seen that when the channels in plate 101 oppose channels 110 and 111, they are in a filling position while when these aforesaid channels oppose channels 112 and 114, they are in a discharge position.

In order to assure proper conditions for complete hydrolysis of the peptides in the alkaline sample solution, it is desirable that the hydrolyzer valve be maintained at a temperature above about 90°C., most preferably at a temperature of about 95°C. Additionally, the holding time for the alkaline sample stream between the filling position and the discharge position should be at least about 15 minutes. Maximum holding time is obtained by placing the discharge outlets adjacent to the inlets so that the arc of rotation between the two positions is at a maximum. Suitable adjustments of the time between activating signals to the stepping motor as well as to the number of steps in the complete rotation may be made to produce the desired holding time.

In viewing the hydrolyzer valve embodiment of FIG. 2 and assuming that the hydrolyzer valve has completed at least one complete cycle of operation, then it can be understood that in the position shown channel a will be in the filling position, channel t will be in the discharging position and channels b through s will be holding volumes of alkaline sample stream in various stages of hydrolysis.

I claim:

1. An improved fluorescence peptide analyzer which analyzer comprises in combination:
   a. peptide sample separation means wherein a peptide containing sample is eluted into an eluent stream of varying peptide content;
   b. discontinuous two-position sampling valve means in operative fluid flow relationship with said peptide sample separation means whereby said eluent stream is brought to said sampling valve means wherein in a first valve position said eluent stream is sent to a fraction collector and in a second valve position said eluent stream is diverted as a sample stream;
   c. alkaline solution addition valve in operative fluid flow relationship with said diverted sample stream wherein alkaline solution derived from an alkaline solution storage means in operative fluid flow relationship with said addition valve is added to said diverted sample stream so as to produce an alkaline sample stream;
   d. hydrolyzer component in operative fluid flow relationship with said alkaline sample stream, said hydrolyzer component comprising an outer enclosure containing heating means and an inner hydrolyzer valve, said hydrolyzer valve comprising
      i. a cylindrical plate having a plurality of channels bored through its longitudinal axis and disposed symmetrically around its center axis said cylindrical plate being rotatably mounted between an upper and a lower fixed plate, one of said fixed plates having alkaline sample stream inlet means and buffer solution inlet means wherein buffer solution is provided from a buffer solution storage means which is in operative flow relationship with said buffer solution inlet means and the other having waste outlet means and detection system outlet means, said inlet and outlet means being so constructed and arranged as to be in operative fluid flow relationship with any two suitably opposed channels in said cylindrical plate and in particular said alkaline sample stream inlet means and said waste outlet means are in operative fluid flow relationship with each other through a suitably opposed channel in said cylindrical plate and said buffer solution inlet means and said detection system outlet means are in operative fluid flow relationship with each other through a suitably opposed channel in said cylindrical plate, and
      ii. a stepping motor operatively connected to said cylindrical plate, said stepping motor having a step corresponding to the number of channels in said cylindrical plate which stepping motor upon activation will cause corresponding rotation of said cylindrical plate, wherein rotation of said cylindrical plate will cause entrapment and transfer of alkaline sample stream contained in the channel opposing said alkaline sample stream inlet means and waste outlet means, said entrapment and transfer continuing with concomitant hydrolysis of the peptides in said alkaline sample stream to form a hydrolyzed sample stream containing hydrolysis products having primary amino groups until said channel has been rotated to a position opposing said buffer solution inlet means and said detection system outlet means where said hydrolyzed sample stream is washed out from said hydrolyzer component by buffer solution from said inlet means; and,
   e. fluorescence detection means in operative fluid flow relationship with said detection system outlet means wherein said hydrolyzed sample stream is treated with a fluorogen provided from a fluorogen storage means in operative fluid flow relationship with said hydrolyzed sample stream which produces a fluorophor by reaction with the primary amino group of the hydrolysis products in said hydrolyzed sample stream, said fluorophor is excited and the resulting fluorescence measured.

2. The analyzer of claim 1 wherein from about 10 to about 60 channels are contained in said cylindrical plate.

3. The analyzer of claim 1 wherein each said channel in said cylindrical plate has a volume in the range of from about 10 to about $100\mu$ l.

4. The analyzer of claim 1 wherein said cylindrical plate is clamped between said upper and lower fixed plates and the surfaces between said cylindrical plate and said fixed plates are machined to a low friction finish so as to provide a liquid tight seal thereby preventing leakage of the liquid between the channels of said cylindrical plate and the plates.

5. The analyzer of claim 1 wherein said lower fixed plate contains said alkaline sample stream inlet means and said buffer solution inlet means and the said upper fixed plate contains said waste outlet means and said detection system outlet means.

6. The analyzer of claim 1 wherein the alkaline solution addition valve adds alkaline solution to said diverted sample stream when said discontinuous 2-position sample valve means is in its second valve position and recycles said alkaline solution when said discontinuous valve means is in its first valve position.

7. The analyzer of claim 1 wherein said discontinuous 2-position sampling valve and said step motor are activated by signal generated from said fraction collector.

* * * * *